Dec. 27, 1932.  T. R. ALEXANDER  1,892,029
TILTING DUMP TRUCK
Filed April 16, 1931
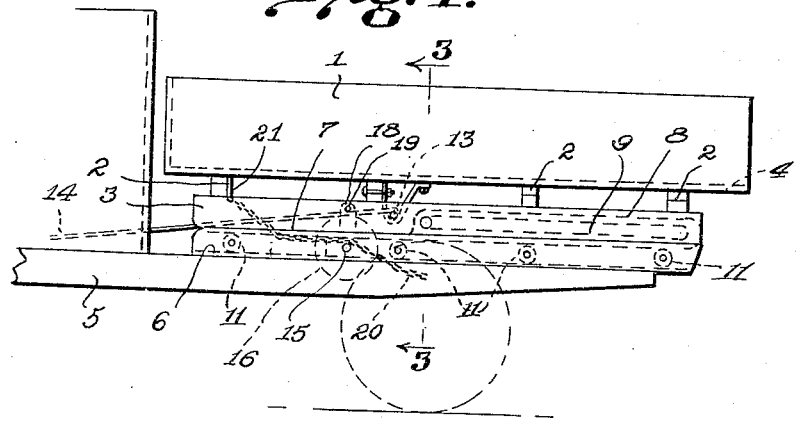
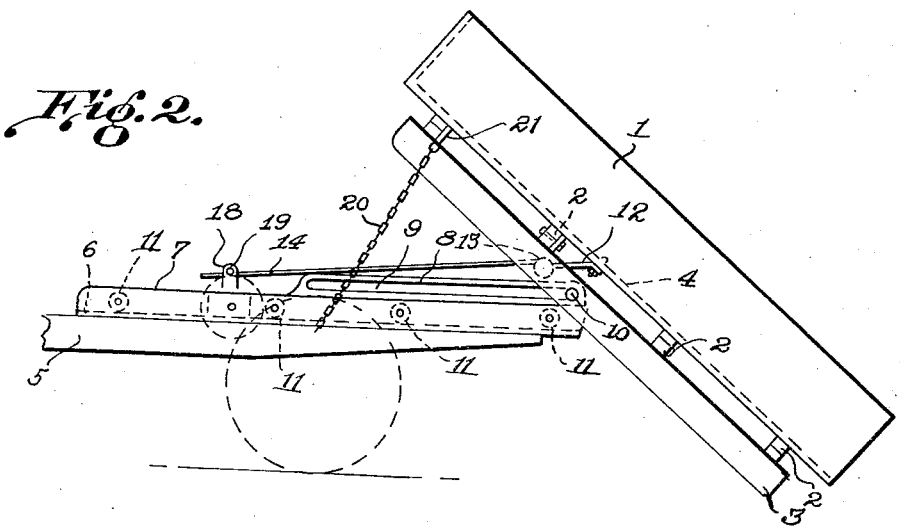
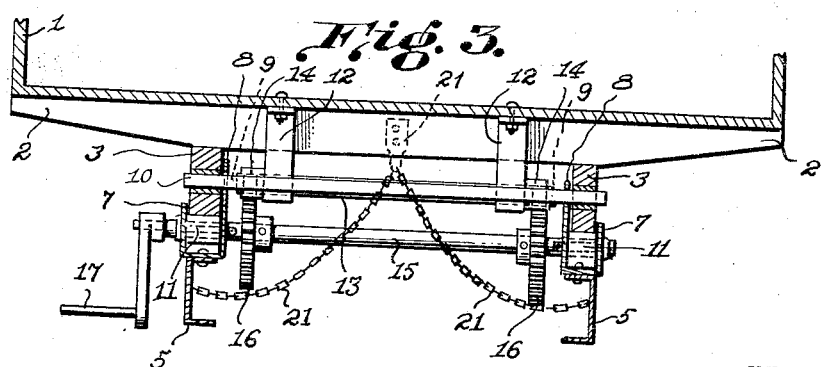
INVENTOR:
T. R. Alexander
BY: Marks & Clerk
ATTORNEYS.

Patented Dec. 27, 1932

1,892,029

UNITED STATES PATENT OFFICE

THOMAS RUTLEDGE ALEXANDER, OF KAIKOURA, NEW ZEALAND

TILTING DUMP TRUCK

Application filed April 16, 1931, Serial No. 530,692, and in New Zealand September 1, 1930.

The present invention relates to improved means for tipping or unloading trucks, lorries or the like, and has for its object to provide simple and effective tipping or unloading means without it being necessary to provide hydraulic screw levers or other elevating devices.

A leading feature of my invention is the provision of means whereby the body of the truck or lorry containing the load is horizontally moved along rollers or a bed secured to the chassis frame until, in the case of a tipping truck, it pivots and tips about the back edge of the chassis, allowing gravity to operate and tip the truck by its own overhanging weight, and until in the case where it is not desired to tip the lorry, the truck body is in a sufficient rearward position for unloading purposes.

It will be observed that my invention is not only applicable to cases where it is desired to tip the load, but it is also applicable to those cases in which the truck body may be moved backwards to an unloading stage or bank.

The invention will now be described with reference to the drawing in which Figure 1 is a side elevation of the rear portion of a truck chassis showing the invention mounted thereon in the normal horizontal position as when loaded, Figure 2 is a side elevation of the invention showing the truck body in the tipping position, while Figure 3 is a cross sectional elevation on line 3—3 Figure 1 looking from the rear end and showing the relative positions of the tipping mechanism in relation to the chassis frame.

The body 1 which may be of any usual construction suitably modified for the purpose of the present invention, may be mounted on transverse or lateral bearers 2, which in turn are supported on longitudinal runners 3. Preferably the floor 4, bearers 2, and runners 3, are securely bolted or otherwise rigidly fastened together.

Mounted upon, and preferably riveted to the chassis members 5 are channel or U shaped guide members 6 having vertical legs 7 and 8 with sufficient width between the legs to receive the longitudinal runners 3. The inner legs 8 of these guide members 6 are designed to project vertically above the outer leg 7 to provide longitudinal slots 9, which receive the ends of the fulcrum pin 10, which extends laterally between the runners 3, and is suitably housed in and secured thereto in a position preferably longitudinally situated slightly forward of the longitudinal centre of gravity of the truck body containing the load.

In order to facilitate the movement of the guide members 3 within the channel shaped guide members 6, a plurality of rollers 11 are suitably housed within the legs 7 and 8, being suitably spaced upon bolts or pins for the purpose of supporting the runners 3. It is, of course, obvious that other known means of facilitating the movement of the runners 3 may be provided instead of rollers 11.

Bearings 12 secured to underside of the truck body floor 4 are provided to carry a transverse or lateral rod 13 to the ends of which are pivotally attached the ends of the longitudinal toothed arms or racks 14. A transverse spindle 15 housed in the legs 7 and 8 in a position forward of the spindle 13 is provided to carry and drive the toothed wheels 16, which are adapted to gear with the arms or racks 14. One end of the spindle 15 is preferably secured to receive actuating means such as the removable crank handle 17 (see Figure 3). Means are provided to ensure that the racks 14 are retained in gear with the toothed wheel 16, and these may comprise brackets 18 projecting upwardly from the legs 8 of the guide members 6, which are adapted to receive a transverse roller 19 which prevent vertical movement on the part of the rack members.

If necessary, conveniently disposed collars may be provided on the roller 19 to inhibit lateral movement of the racks 14.

Suitable chains 20, each having one end attached to an eyeplate 21, the free ends being suitably secured one to each chassis member 5, are provided to allow the maximum tipping slope to be regulated.

When used as a tipping truck or lorry, the operation is as follows. The turning of the handle 17 in a clockwise direction will revolve wheel 16, the teeth of which engage in the racks 14 cause the runners 3 carrying the body 1 to move rearwardly on the rollers 11, the spindle 10 likewise sliding along the slot 9 until it is brought to rest at the rear end thereof, when owing to the position of the spindle 10 in relation to the centre of gravity of the loaded truck body 1, the body 1 operated by gravity tips as shown in Figure 2. To return the body 1 in the normal horizontal position, the handle 17 is turned in an anticlockwise direction, any necessary assistance being provided by pulling on the chains 20, and the racks 14 will be drawn inwards causing the body 1 to assume its normal position (after having been drawn inwards for a comparatively short distance) on to the rollers 11. Suitable means (not shown) may be provided for locking the body 1 into the normal position for the transport of material.

When it is not desired to tip the truck, means (not shown) are provided to prevent tipping action, in which case by appropriate actuation of the crank 17, the truck body is projected rearwardly to the desired unloading position.

I claim:

1. A tilting dump truck comprising a wheel supported chassis, guide members secured along opposite sides of the chassis and provided with longitudinally slotted inner portions, rollers mounted on said guide members, a body, longitudinally disposed runners on the body and operating along the guide members and supported by the rollers thereon, brackets on the body, a transverse rod supported by the brackets, a pair of rack members pivotally supported on said rod, a fulcrum pin extending laterally between said runners and having its ends passing through the longitudinal slots in the inner portions of said guide members, a transverse spindle passing through said guide members, two gear wheels carried by said spindle to mesh respectively with the said two rack members, means for retaining the rack members in gear with the gear wheels including brackets rigid with respect to the guide members, and rollers rotatably supported on the brackets and positioned in spaced relation above the gear wheels and the rack bars, means for rotating said spindle in the desired direction until the truck body passes the centre of gravity whereupon it tilts about said fulcrum pin, and means between the runners and the chassis for regulating the angle of tilt.

2. A tilting dump truck comprising a chassis including ride bars, channel-like guide members of substantially U-shaped formation disposed vertically on and secured to the upper surface of the side bars of the chassis, the inner walls of the guide members being considerably higher than the outer walls and provided with longitudinal slots, rollers mounted between the lower portions of the walls of the channel shaped members, a body, runners mounted on the undersurface of the body and disposed between the walls of the guide members and supported on the rollers therein, a fulcrum pin extending laterally between said runners and having its ends passing through the longitudinal slots in the inner walls of the guide members and serving to slidably and tiltably connect the runners to the guide members, and a gear and rack mechanism for controlling the raising and lowering movement of the body.

In testimony whereof I affix my signature.

THOMAS RUTLEDGE ALEXANDER.